2,985,564
Patented May 23, 1961

2,985,564
PRODUCTION OF PUROMYCIN

Richard Weindling, West Nyack, N.Y., assignor to American Cyanamid Company, New York, N.Y., a corporation of Maine No Drawing. Filed Sept. 3, 1957, Ser. No. 681,456

6 Claims. (Cl. 195—80)

This invention relates to the manufacturing of antibiotics and more particularly to an improved process for the production of puromycin.

Puromycin, an antibiotic produced by a new species of actinomycete, Streptomyces alboniger, American Type Culture Collection (ATCC) Nos. 12461 and 12462 has the ability to inhibit both gram-positive and gram-negative bacteria and is also active in vivo against species of the protozoan genus Trypanosoma. The physical characteristics of puromycin are described by Porter et al. in Antibiotics and Chemotherapy, 2, 409 (1952). The structure of puromycin has been elucidated as 6-dimethylamino-9-[3-(p - methoxy-L-β-phenylalanylamino)-3-deoxy-β-D-ribofuranosyl] purine [Waller et al., J.A.C.S. 75, 2025 (1953)], and has the following structural formula:

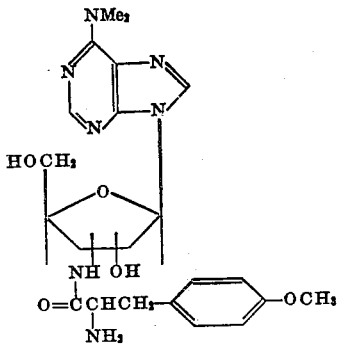

A fermentation process for producing puromycin comprising propagating Streptomyces alboniger in an aqueous nutrient medium under controlled conditions of temperature and pH is described and claimed in U.S. Patent No. 2,763,642 issued to Porter et al. on September 18, 1956.

I have now discovered, in accordance with the present invention, that if the fermentation medium in which the microorganism Streptomyces alboniger is grown is modified to include a small amount of a compound of the type hereinafter described, the yield of antibiotic so produced is substantially increased. Under ordinary fermentation conditions used for the production of puromycin, the yield is of the order of about 200 to 300 gammas (γ) of that antibiotic per ml. of medium. However, for example, when a small amount of ethylenediamine tetraacetic acid, which is a representative member of the type or group of compounds usable in accordance with the present invention, is incorporated into the fermentation medium, the yield of puromycin is increased by at least 33% and in some instances by as much as 114%.

Aside from the modification described immediately above, fermentation conditions under which my improved process may be practiced are, in general, those associated with the cultivation of fungi in the production of antibiotics. I prefer, however, the use of those described in the aforesaid U.S. Patent 2,763,642 as the basic conditions from which one may deviate in accordance with my herein described invention. A suitable basal nutrient medium contains a source of carbon such as a carbohydrate; a source of nitrogen, organic or inorganic; a source of mineral salts; and small amounts of various trace elements usually associated as impurities in the constituents of the medium or the tap water used in preparing same.

As a carbon source there may be used ordinary starch, the so-called soluble starches and dextrins, and sugars such as sucrose, glucose, maltose, xylose, lactose or the like and other water-soluble or partially water-soluble carbohydrate substances such as the sugar alcohols, mannitol, sorbitol and the like. The amount of such carbon sources for best antibiotic production in the medium may vary considerably, for instance from about ½ to 1% to 5% by weight of the total weight of the fermentation medium. Nitrogen sources include proteins such as casein, zein, lactalbumin; protein hydrolysates, proteoses, peptones, peptides and commercially available materials, such as N-Z Amine which is understood to be a casein hydrolysate; also corn steep liquor, soy bean meal, gluten, cotton seed meal, fish meal, meat extracts, stick liquor, liver cake, yeast extract, distillers solubles and the like; amino acids, urea, ammonia and nitrate salts and so forth. Minerals include such organic compounds as will provide the cations of sodium, potassium, calcium, magnesium, and so forth, and such as will provide chloride, sulfate, phosphate and other anions. The so-called trace elements such as boron, cobalt, iron, copper, zinc, manganese, chromium, molybdenum, etc., may be used to advantage and are usually present, as mentioned above, in the form of impurities in the medium ingredients and/or tap water and additional quantities of these may be unnecessary.

The fermentation mixture is aerated in the customary manner forcing sterile air through it usually at the rate of about 1 volume of air per volume of fermentation medium per minute. To minimize contamination with foreign microorganisms, fermentation vessels should be closed and the pressure 2 to 15 pounds above atmospheric pressure maintained in the vessel. Mechanical agitation, in addition to the agitation provided by the aeration is generally advisable. Antifoaming agents, such as 1% octadecanol in lard oil, may be added from time to time as required to prevent excessive foaming.

As described in the aforesaid U.S. Patent 2,763,642, the pH of the fermentation medium is generally around 4.5 to 8.0 at the beginning of the fermentation but as the fermentation continues the pH tends to rise to as high as about 9.0 at the end of the fermentation. The preferred temperature of the fermentation process is about 26 to 28° C., although temperatures as low as about 20° C. or as high as about 37° C. may be used. Although as also described in the aforesaid U.S. Patent 2,763,642 the maximum yield is generally obtained within 48 to 70 hours of fermentation under optimum conditions, I have found that the maximum yield for the process when practiced in accordance with my improvements herein described is generally obtained after a slightly longer fermentation time, namely, 90 to 140 hours.

To the fermentation medium, and preferably at the start of the fermentation process, there is added a small amount, usually of the order of from 0.05 to 1.5% of a compound selected from the group consisting of alkylene diamine N,N,N¹,N¹-tetraalkanoic acids where the alkanoic moiety contains at least two carbon atoms, cycloalkane diamine N,N,N¹,N¹-tetraalkanoic acids where the alkanoic moiety contains at least two carbon atoms and an alcohol obtainable by the reduction of one carboxy group in any one of said tetraalkanoic acids. Amounts up to about 5.0% of the above type compounds may, in some instances, be added depending upon the nutritional requirements and characteristics of individual strains of the *Streptomyces alboniger* species. As illustrative of the first category in the above group may be mentioned:

Ethylenediamine N,N,N¹,N¹-tetraacetic acid-
(HOOCCH₂)₂N—CH₂—CH₂—N(CH₂COOH)₂
Trimethylenediamine N,N,N¹,N¹-tetraacetic acid-
(HOOCCH₂)₂N—CH₂—CH₂—CH₂—N(CH₂COOH)₂
1,2-propylenediamine N,N,N¹,N¹-tetraacetic acid-
(HOOCCH₂)N—CH(CH₃)CH₂N(CH₂COOH)₂

As illustrative of the second category in the above group may be mentioned:

1,2-diamino cyclohexane N,N,N¹,N¹-tetraacetic acid

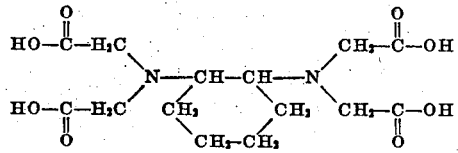

As illustrative of the third category in the above group may be mentioned:

N-hydroxyethyl ethylenediamine N,N,N¹,N¹-triacetic acid

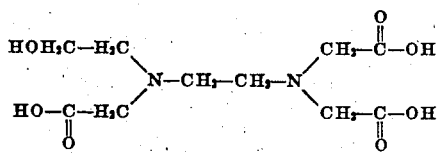

After the fermentation process is complete, the antibiotic may be recovered from the fermentation liquor in a manner similar to that employed in recovering other antibiotics from fermentation liquors. A particularly useful method is described in the aforesaid U.S. Patent 2,763,642 and which, briefly involves extracting the activity from the fermentation liquor by the use of a water-immiscible solvent such as n-butanol, pentanol, ethyl acetate, ethyl methyl ketone and the like. The antibiotic substance is preferably first adsorbed on an adsorbent such as activated charcoal, diatomaceous earth, magnesium silicate, etc., and the activity eluted therefrom by the use of a solvent as described. The adsorption and elution steps may be carried out in various ways familiar to those skilled in the art. The antibiotic may be obtained from the solvent extract by precipitating the hydrochloride salt thereof, and the free base may be prepared in crystalline form by treatment of the hydrochloride salt with any one of the common alkalies such as sodium hydroxide.

As to the preferred mode of carrying out the process of my invention I recommend the use per liter of fermentation broth of about 8.0 g. of ethylene diamine tetraacetic acid in connection with the particular strain of *Streptomyces alboniger* and the particular main fermentation medium used in Example 1 shown hereinafter, wherein the fermentation time would be about 96 hours, the pH of the fermentation medium at the beginning would be about 8.0, the pH of the fermentation medium at the end would be about 8.9, and the fermentation temperature between 26 and 27° C.

The following examples will serve to illustrate my invention in greater detail.

EXAMPLE 1

Small-flask fermentation runs were carried out as follows: Using agar slants of *Streptomyces alboniger* strain P638–166 which strain is an induced mutant of *Streptomyces alboniger* ATCC No. 12461, an inoculum was prepared in a medium having a composition in grams per liter consisting of corn steep liquor (20 g.), fluidity starch (30 g.) and calcium carbonate (7 g.) and ammonium sulfate (2 g.). To establish a control for this particular test, one milliliter of the inoculum was aseptically transferred to each of a set of three 250 ml. Erlenmeyer flasks, each containing 25 ml. of a sterile medium prepared by dissolving/suspending the following nutrients, in the amounts shown below, in distilled water and adding sufficient additional distilled water to make a total volume of one liter:

|   | G. |
|---|---|
| Corn steep liquor | 50 |
| CaCO₃ | 2 |
| Meat solubles | 20 |
| Fluidity starch | 20 |
| Magnesium carbonate | 5 |
| Lard oil | 10 |

Similarly inoculated were three other sets of three 250 ml. Erlenmeyer flasks, each set containing 25 ml. of the above-described sterile medium per flask and, in addition, 0.8, 2.4 and 8.0 grams per liter, respectively, of a commercial grade of ethylenediamine N,N,N¹,N¹-tetraacetic acid tetrasodium salt which assayed 80% ethylenediamine-N,N,N¹,N¹-tetraacetic acid tetrasodium salt. Following the inoculation step, the flasks were placed on a rotary shaker operating at 180 r.p.m. and fermentation allowed to proceed at 26–27° C. for 5 days. The pH at the start of the fermentation in each case was about 8.0. The final resulting fermentation mashes were assayed turbidimetrically against *Klebsiella pneumoniae* by the method for determination of antibiotic activity described on page 36 of Assay Methods for Antibiotics—a Laboratory Manual (D. C. Grove and W. A. Randall), published by Medical Encyclopedia, Inc. (1955). The results in terms of gammas (γ) of puromycin per milliliter of fermentation mash as average values from three flasks, are given in Table I.

Table I

| Grams per liter of Ethylenediamine N,N,N¹,N¹—tetraacetic acid tetrasodium salt, 80% | γ of Puromycin per ml. | Fermentation pH after 96 hours |
|---|---|---|
| 0 | 320 | 8.7 |
| 0.8 | 430 | 8.7 |
| 2.4 | 460 | 8.7 |
| 8.0 | 605 | 8.9 |

EXAMPLE 2

This example is essentially the same as Example 1 except that N-hydroxyethyl ethylenediamine N,N¹,N¹-triacetic acid, technical grade, was used in place of ethylenediamine N,N,N¹,N¹-tetraacetic acid 80%. The initial fermentation mash pH in each case was about 8.0. The results are given in Table II.

Table II

| Grams of N-Hydroxyethyl ethylenediamine N,N¹,N¹-triacetic acid per liter | γ of Puromycin per ml. | Fermentation pH after 96 hours |
|---|---|---|
| 0 | 320 | 8.7 |
| 0.8 | 525 | 8.5 |
| 2.4 | 585 | 8.6 |
| 8.0 | 685 | 8.8 |

EXAMPLE 3

This example is the same as Example 1 with the exception that 1,2-propylenediamine N,N,N¹,N¹-tetraacetic acid, technical grade, was used in place of ethylenediamine N,N,N¹,N¹-tetraacetic acid 80% and at slightly different concentrations. The initial fermentation medium pH in each case was about 8.0. The results are given in Table III.

Table III

| Grams per Liter of 1,2-Propylenediamine N,N,N¹,N¹-tetraacetic acid | γ of Puromycin per ml. | Fermentation pH after 96 hours |
|---|---|---|
| 0 | 375 | 8.6 |
| 0.4 | 560 | 8.5 |
| 1.2 | 605 | 8.5 |
| 4.0 | 495 | 8.6 |

EXAMPLE 4

This example is the same as Example 3 except that 1,2-diaminocyclohexane-N,N,N¹,N¹-tetraacetic acid, technical grade, was used instead of 1,2-propylenediamine N,N,N¹,N¹-tetraacetic acid. The initial fermentation medium pH in each case was about 8.0. The results are given in Table IV.

Table IV

| Grams per Liter of Diaminocyclohexane-N,N,N¹,N¹-tetraacetic acid per liter | γ of Puromycin per ml. | Fermentation pH after 96 hours |
|---|---|---|
| 0 | 375 | 8.6 |
| 0.4 | 425 | 8.6 |
| 1.2 | 440 | 8.7 |
| 4.0 | 655 | 8.6 |

EXAMPLE 5

This example is essentially along the same lines as Example 1 with the following exceptions: that, *Streptomyces alboniger* ATCC 12462 was used instead of strain P638–166; that, the sterile medium used in each of the shaker flasks was of the following composition as expressed in grams per liter:

|   | G. |
|---|---|
| Corn steep liquor | 50 |
| Citric acid anhydrous, U.S.P. | 2 |
| $CaCO_3$ | 2 |
| Meat solubles | 20 |
| Fluidity starch | 10 |
| Magnesium carbonate | 3 |
| Lard oil | 10 | that, 0 and 10.0 g., respectively, of the commercial grade of ethylenediamine N,N,N¹,N¹-tetraacetic acid tetrasodium salt assaying 80% pure tetrasodium salt were used in two sets of three 250 ml. Erlenmeyer flasks, each set containing 25 ml. of the above-described sterile medium; and that, the fermentation time period was 140 hours. The control, i.e., the set containing no added ethylenediamine N,N,N¹,N¹-tetraacetic acid tetrasodium salt, after 140 hours of fermentation time assayed an average value of 327γ of puromycin per ml. In contrast, at the end of the 140 hours fermentation time, the set containing 10 g. of the commercial grade ethylenediamine N,N,N¹,N¹-tetraacetic acid tetrasodium salt per flask assayed 440 γ/ml., representing a 34.5% improvement in yield of puromycin.

I claim:

1. A method for the production of puromycin which comprises propagating the microorganism *Streptomyces alboniger* under aerobic conditions in an aqueous nutrient solution containing a compound selected from the group consisting of alkylenediamine N,N,N¹,N¹-tetraalkanoic acids where the alkanoic moiety contains at least two carbon atoms, cycloalkanediamine N,N,N¹,N¹-tetraalkanoic acids where the alkanoic moiety contains at least two carbon atoms and an alcohol obtainable by the reduction of one carboxy group in any one of said tetraalkanoic acids until substantial antimicrobial activity is imparted to the solution.

2. The method of claim 1 where the aqueous nutrient solution contains between about 0.05% and 1.5% of said compound.

3. The method of claim 2 where the compound is ethylenediamine N,N,N¹,N¹-tetraacetic acid.

4. The method of claim 2 where the compound is 1,2-propylenediamine N,N,N¹,N¹-tetraacetic acid.

5. The method of claim 2 where the compound is 1,2-diaminocyclohexane N,N,N¹,N¹-tetraacetic acid.

6. The method of claim 2 where the compound is N-hydroxyethyl ethylenediamine N,N,N¹-triacetic acid.

References Cited in the file of this patent

UNITED STATES PATENTS

| 2,763,591 | Hatch et al. | Sept. 18, 1956 |
| 2,763,642 | Porter et al. | Sept. 18, 1956 |
| 2,797,187 | Szumski et al. | June 25, 1957 |
| 2,844,515 | Sobotka et al. | July 22, 1958 |

OTHER REFERENCES

Martell et al.: Chemistry of the Metal Chelate Compounds, Prentice-Hall Inc., 1952, pages 471–473, 479, 499 to 512.

Chemical and Engineering News (C. & E.N.), Nov. 19, 1956, page 5753.